(12) United States Patent
Chen et al.

(10) Patent No.: US 12,505,944 B2
(45) Date of Patent: Dec. 23, 2025

(54) OPTICAL ELEMENT DRIVING MECHANISM

(71) Applicant: TDK TAIWAN CORP., Taoyuan (TW)

(72) Inventors: Yi-Ho Chen, Taoyuan (TW);
Chao-Chang Hu, Taoyuan (TW);
Hsiao-Hsin Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 524 days.

(21) Appl. No.: 17/970,884

(22) Filed: Oct. 21, 2022

(65) Prior Publication Data

US 2023/0127990 A1 Apr. 27, 2023

Related U.S. Application Data

(60) Provisional application No. 63/270,806, filed on Oct. 22, 2021.

(51) Int. Cl.
| | |
|---|---|
| *G02B 27/64* | (2006.01) |
| *G02B 7/00* | (2021.01) |
| *G02B 7/02* | (2021.01) |
| *G02B 7/04* | (2021.01) |
| *G02B 7/08* | (2021.01) |
| *G03B 9/14* | (2021.01) |
| *H01F 7/08* | (2006.01) |
| *H01F 7/16* | (2006.01) |
| *H04N 23/51* | (2023.01) |
| *H04N 23/54* | (2023.01) |
| *H04N 23/55* | (2023.01) |

(52) U.S. Cl.
CPC ............. *H01F 7/081* (2013.01); *G02B 7/008* (2013.01); *G02B 7/02* (2013.01); *G02B 7/023* (2013.01); *G02B 7/04* (2013.01); *G02B 7/08* (2013.01); *G02B 27/646* (2013.01); *G03B 9/14* (2013.01); *H01F 7/16* (2013.01); *H04N 23/51* (2023.01); *H04N 23/54* (2023.01); *H04N 23/55* (2023.01)

(58) Field of Classification Search
CPC ............... G02B 7/02; G02B 7/04; G02B 7/09
USPC .................................................. 359/819, 823
See application file for complete search history.

(56) References Cited

U.S. PATENT DOCUMENTS

| | | | | |
|---|---|---|---|---|
| 9,791,661 | B2* | 10/2017 | Hayashi | ................... G02B 7/08 |
| 11,262,527 | B2* | 3/2022 | Yang | ........................ G02B 7/04 |
| 11,474,416 | B2* | 10/2022 | Huang | ..................... G02B 7/08 |
| 11,604,327 | B2* | 3/2023 | Yang | .................... G02B 7/1805 |
| 11,681,156 | B2* | 6/2023 | Hu | ...................... G02B 13/0065 |
| | | | | 359/554 |
| 11,719,996 | B2* | 8/2023 | Hu | ......................... G02B 7/285 |
| | | | | 359/696 |

(Continued)

*Primary Examiner* — Zachary W Wilkes
*Assistant Examiner* — Elizabeth M Hall
(74) *Attorney, Agent, or Firm* — MUNCY, GEISSLER, OLDS & LOWE, P.C.

(57) ABSTRACT

An optical element driving mechanism is provided, including a fixed part, a movable part, and a driving assembly. The fixed part includes a base. The base corresponds to an optical module. The movable part is connected to an optical element. The movable part is movable relative to the fixed part. The driving assembly drives the movable part to move relative to the fixed part. The base includes an accommodation portion, and the accommodation portion has a recessed structure.

18 Claims, 9 Drawing Sheets

(56) References Cited

U.S. PATENT DOCUMENTS

| | | | | |
|---|---|---|---|---|
| 11,774,704 B2* | 10/2023 | Hu | ............................ | G03B 5/00 |
| | | | | 359/824 |
| 11,796,894 B2* | 10/2023 | Yu | ............................ | G02B 7/04 |
| 11,852,886 B2* | 12/2023 | Hu | ......................... | G02B 7/003 |
| 11,867,970 B2* | 1/2024 | Lin | ......................... | H02K 37/04 |
| 11,921,307 B2* | 3/2024 | Wang | .................. | G02B 13/0075 |
| 12,032,224 B2* | 7/2024 | Lin | ............................ | G02B 7/09 |
| 12,066,745 B2* | 8/2024 | Yu | ............................ | G02B 7/04 |
| 12,130,546 B2* | 10/2024 | Hu | .......................... | G03B 3/10 |
| 12,153,280 B2* | 11/2024 | Chen | .................. | H02K 41/0356 |
| 12,164,172 B2* | 12/2024 | Wang | ........................ | G03B 9/02 |
| 12,225,276 B2* | 2/2025 | Hu | ......................... | G02B 7/023 |
| 12,235,478 B2* | 2/2025 | Weng | ......................... | G03B 5/00 |
| 12,235,510 B2* | 2/2025 | Lin | .......................... | G02B 7/023 |
| 12,235,512 B2* | 2/2025 | Weng | ......................... | H04N 23/55 |
| 2009/0295986 A1* | 12/2009 | Topliss | .................. | G02B 7/026 |
| | | | | 396/73 |
| 2012/0105960 A1* | 5/2012 | Park | .................... | G02B 27/646 |
| | | | | 359/554 |
| 2015/0346587 A1* | 12/2015 | Lim | ........................ | G03B 17/02 |
| | | | | 348/373 |
| 2017/0045710 A1* | 2/2017 | Lee | ........................... | G02B 7/08 |

* cited by examiner

OPTICAL ELEMENT DRIVING MECHANISM

CROSS REFERENCE TO RELATED APPLICATIONS

This application claims the benefit of U.S. Provisional Application No. 63/270,806, filed Oct. 22, 2021, the entirety of which is incorporated by reference herein.

BACKGROUND OF THE INVENTION

Field of the Invention

The present disclosure relates to an optical element driving mechanism, and more particularly, the present disclosure relates to an optical element driving mechanism for an electronic device.

Description of the Related Art

As the relevant technologies have been developed, many electronic devices (such as computers and tablets) have been equipped with the capability to record images and videos. However, when an optical element (such as a lens) having a long focal length is provided in an electronic device, the thickness of the electronic device may be increased, impeding the prospects for miniaturization of the electronic device. Therefore, how to design an optical element driving mechanism and an optical device that help to miniaturize the electronic device has become an important issue.

BRIEF SUMMARY OF THE INVENTION

To solve the problems of the prior art, an optical element driving mechanism is provided, including a fixed part, a movable part, and a driving assembly. The fixed part includes a base. The base corresponds to an optical module. The movable part is connected to an optical element. The movable part is movable relative to the fixed part. The driving assembly drives the movable part to move relative to the fixed part. The base includes an accommodation portion, and the accommodation portion has a recessed structure.

In one of the embodiments of the present disclosure, the base includes a base first portion and a base second portion. In a first direction that is parallel to an optical axis, the base first portion and the accommodation portion at least partially overlap each other. In the first direction, the base second portion does not overlap the accommodation portion. The accommodation portion corresponds to the optical module.

In one of the embodiments of the present disclosure, the base first portion does not overlap the accommodation portion when viewed along a direction that is perpendicular to the first direction.

In one of the embodiments of the present disclosure, the base second portion at least partially overlaps the accommodation portion when viewed along a second direction that is perpendicular to the first direction.

In one of the embodiments of the present disclosure, the base first portion includes a base first portion bottom side, and the base second portion includes a base second portion bottom side. The base first portion bottom side and the base second portion bottom side are not coplanar.

In one of the embodiments of the present disclosure, in the first direction, the optical element driving mechanism has an optical element driving mechanism height. In the first direction, there is a distance between the base first portion bottom side and the base second portion bottom side. The distance between the base first portion bottom side and the base second portion bottom side is greater than a quarter of the optical element driving mechanism height.

In one of the embodiments of the present disclosure, the optical element driving mechanism further included a connecting element. The fixed part further includes an outer frame. The base first portion includes a base first portion connecting wall, and the base second portion includes a base second portion connecting wall. The connecting element is disposed between the outer frame and the base first portion connecting wall, and between the outer frame and the base second portion connecting wall. An area of the base first portion connecting wall is larger than an area of the base second portion connecting wall.

In one of the embodiments of the present disclosure, the base second portion further includes a base second portion supporting wall. The outer frame and the base second portion supporting wall at least partially overlap each other when viewed along the first direction. The outer frame does not overlap the base second portion supporting wall when viewed along a second direction that is perpendicular to the first direction.

In one of the embodiments of the present disclosure, the movable part includes an optical element holder. The driving assembly includes a first supporting assembly, disposed between the optical element holder and the base, and the first supporting assembly includes a first supporting assembly first supporting element, a first supporting assembly second supporting element, and a first supporting assembly third supporting element. The first supporting assembly first supporting element, includes an optical element holder contacting portion, and a base contacting portion. The optical element holder contacting portion abuts against the optical element holder. The base contacting portion abuts against the base. The first supporting assembly second supporting element includes an optical element holder contacting portion, and a base contacting portion. The optical element holder contacting portion abuts against the optical element holder. The base contacting portion abuts against the base. The first supporting assembly third supporting element is disposed between the first supporting assembly first supporting element and the first supporting assembly second supporting element. The first supporting assembly first supporting element, the first supporting assembly second supporting element, and the first supporting assembly third supporting element are arranged along a first direction that is parallel to an optical axis.

In one of the embodiments of the present disclosure, a dimension of the first supporting assembly second supporting element is the same as a dimension of the first supporting assembly first supporting element. A dimension of the first supporting assembly third supporting element is different from the dimension of the first supporting assembly first supporting element and the dimension of the first supporting assembly second supporting element.

In one of the embodiments of the present disclosure, the driving assembly further includes a wire assembly, wherein the wire assembly includes a first wire, and a second wire. The first wire includes a first wire optical element holder contacting portion. The first wire optical element holder contacting portion abuts against the optical element holder. The second wire includes a second wire optical element holder contacting portion. The second wire optical element holder contacting portion abuts against the optical element holder. In the first direction, a minimum distance between the first wire optical element holder contacting portion and the second wire optical element holder contacting portion is smaller than a minimum distance between a center of the first supporting assembly first supporting element and a center of the first supporting assembly second supporting element.

In one of the embodiments of the present disclosure, in the first direction, the first wire optical element holder contacting portion is disposed between the optical element holder contacting portion of the first supporting assembly first supporting element and the optical element holder contacting portion of the first supporting assembly second supporting element.

In one of the embodiments of the present disclosure, the optical element holder includes an optical element holder body, and an optical element holder stopper. The optical element holder stopper extends from the optical element holder body toward the base along a direction that is perpendicular to the first direction. The optical element holder stopper limits a movement range of the first supporting assembly.

In one of the embodiments of the present disclosure, the base includes a base body, and a base stopper. The base stopper extends from the base body toward the optical element holder along a direction that is perpendicular to the first direction. In the first direction, the first supporting assembly is disposed between the optical element holder stopper and the base stopper. The base stopper limits the movement range of the first supporting assembly.

In one of the embodiments of the present disclosure, the fixed part further includes an outer frame, wherein in the first direction, the optical element holder is disposed between the outer frame and the base. The outer frame limits a movement range of the optical element holder when the optical element holder moves along a positive direction of the first direction.

In one of the embodiments of the present disclosure, the base limits the movement range of the optical element holder when the optical element holder moves along an opposite direction of the first direction.

In one of the embodiments of the present disclosure, the first supporting assembly and the base limit a movement range of the optical element holder when the optical element holder moves in a positive direction along a second direction that is perpendicular to the first direction.

In one of the embodiments of the present disclosure, the base limits a movement range of the optical element holder when the optical element holder moves in an opposite direction along a second direction that is perpendicular to the first direction.

In one of the embodiments of the present disclosure, the base limits a movement range of the optical element holder when the optical element holder moves along a third direction that is perpendicular to the first direction.

In one of the embodiments of the present disclosure, the optical element driving mechanism further includes a sensing assembly, including a first magnetic element and a sensing element. A center of the first magnetic element and a center of the sensing element overlap each other along a first direction that is parallel to an optical axis when viewed along a second direction that is perpendicular to the optical axis. The center of the first magnetic element and the center of the sensing element do not overlap each other along the first direction when viewed along a third direction that is perpendicular to the first direction and the second direction.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The scale of the drawings in the present disclosure may be drawn according to the actual size. The scale of the same figure in the present disclosure can be used as the actual manufacturing scale of the devices, equipment, elements, etc. of the present disclosure. It should be noted that each figure may be drawn at different orientations, which may result in different size ratios among different figures. However, the size ratio shown in an individual figure is not affect by the different size ratios between different figures. People with ordinary skill in the art can understand that the size ratio of the figures in the present disclosure can be used as a distinguishing feature from the prior art.

Figure 1:
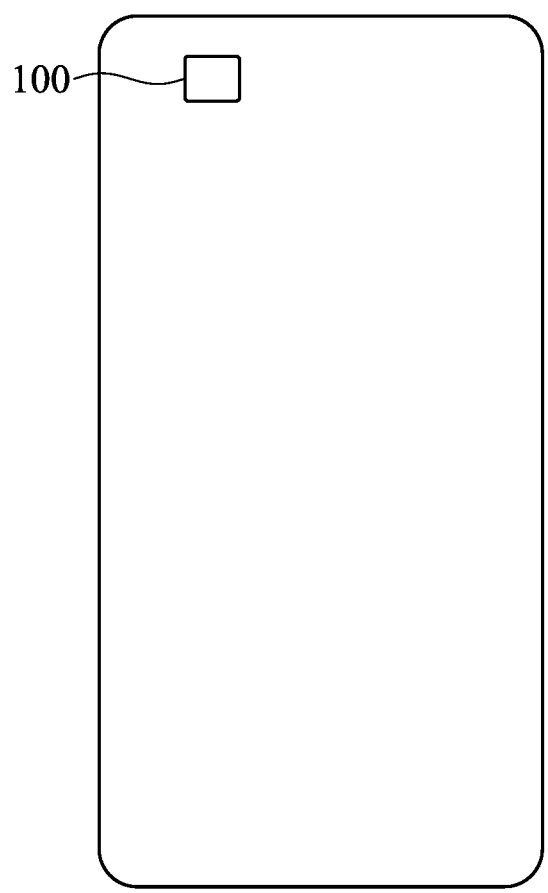
FIG. 1 is a schematic view of an electrical device according to some embodiment of the present disclosure.

Firstly, please refer to FIG. 1, FIG. 1 is a schematic view of an electrical device 1 according to some embodiment of the present disclosure. As shown in FIG. 1, an optical element driving mechanism 100 of some embodiment of the present disclosure may be mounted in an electrical device 1 for taking photos or videos, wherein the aforementioned electrical device 1 may, for example, be a smartphone or a digital camera, but the present disclosure is not limited to these. It should be noted that the position and the size between the optical element driving mechanism 100 and the electrical device 1 shown in FIG. 1 are only an example, which is not for limiting the position and the size between the optical element driving mechanism 100 and the electrical device 1. In fact, according to different needs, the optical element driving mechanism 100 may be mounted at different positions in the electrical device 1

Figure 2:
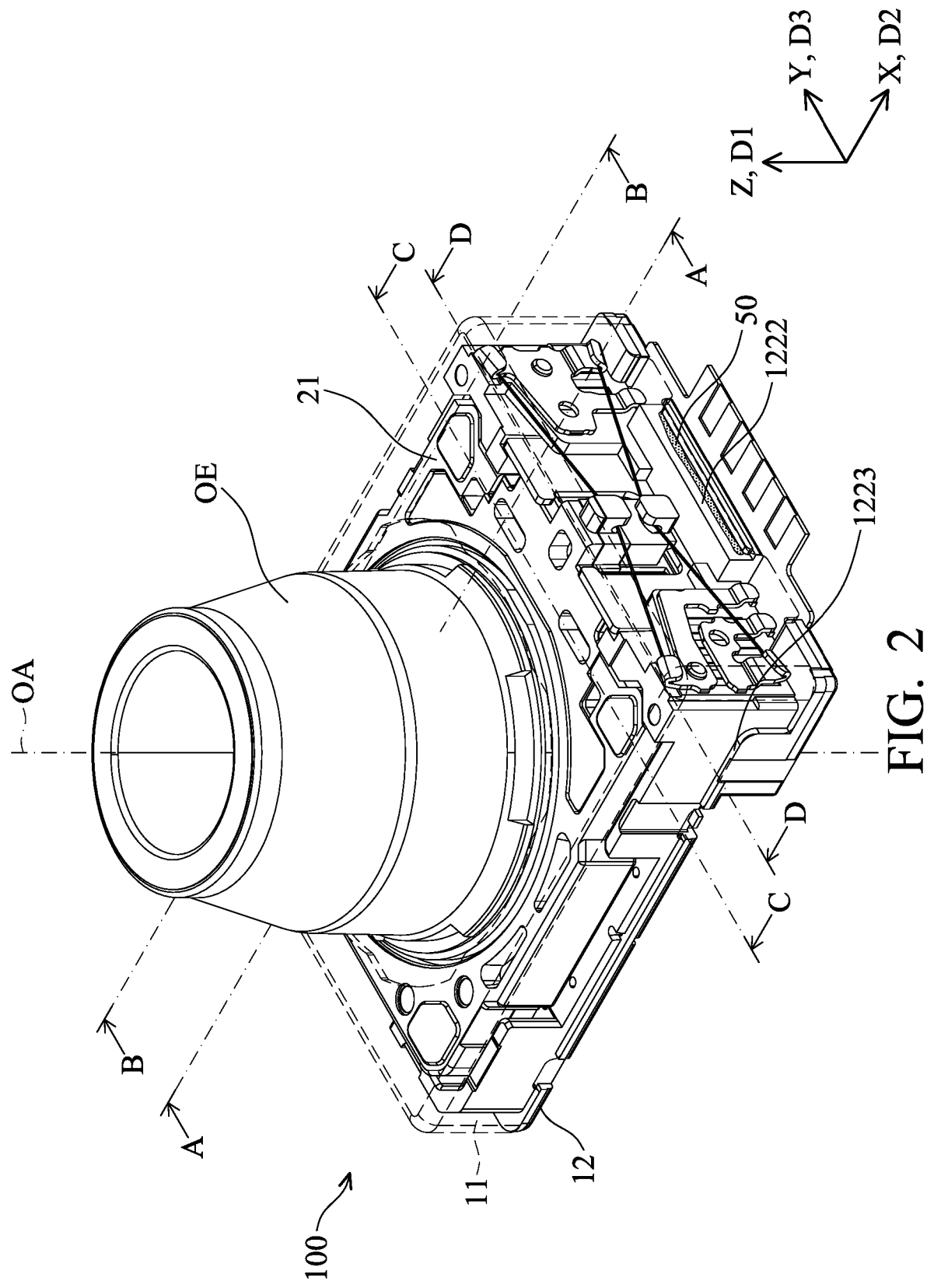
FIG. 2 is a schematic view of an optical element driving mechanism and an optical element according to some embodiments of the present disclosure, wherein an outer frame is represented by a dotted line.
Figure 3:
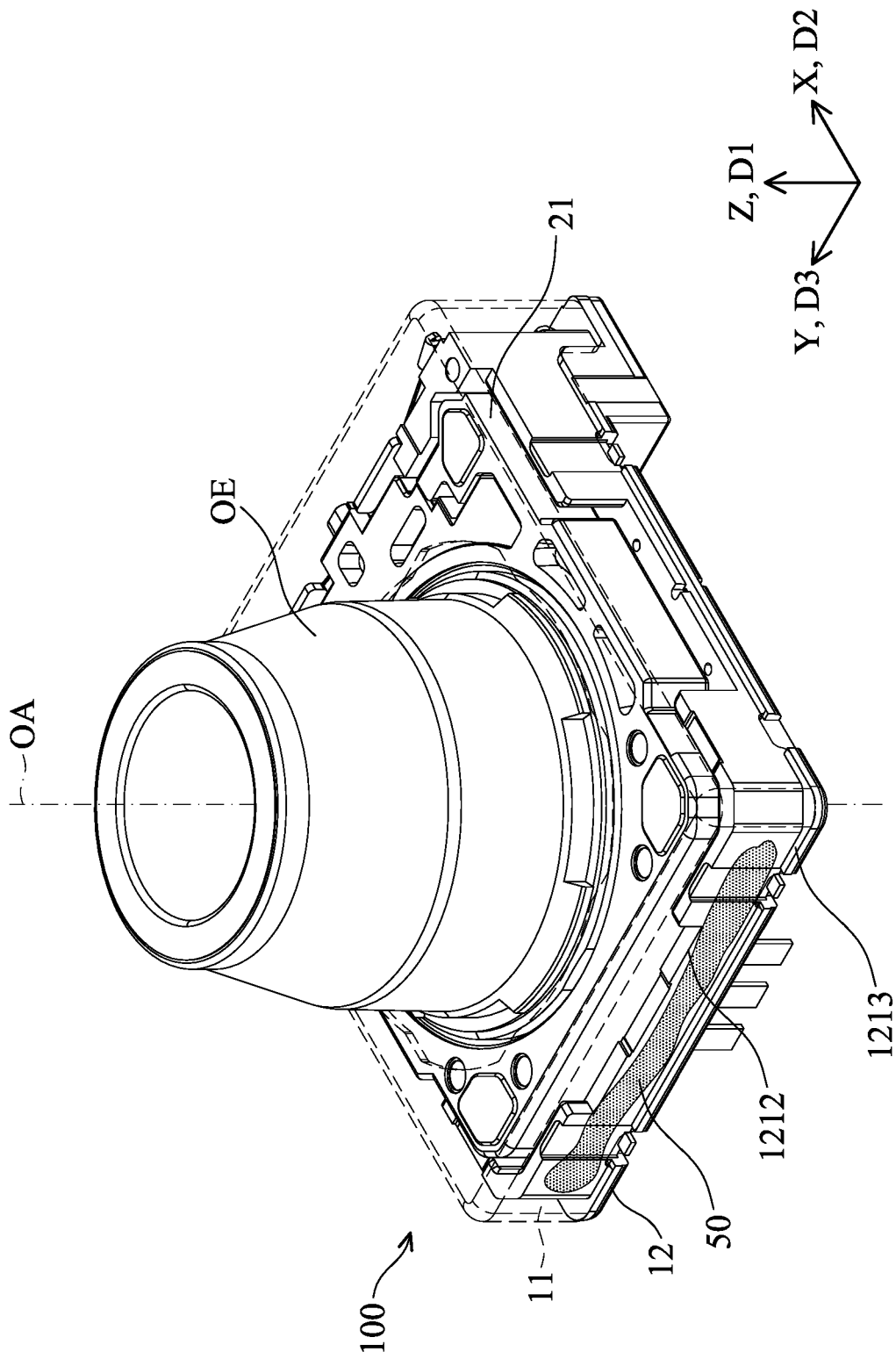
FIG. 3 is a schematic view of the optical element driving mechanism and the optical element according to some embodiments of the present disclosure, wherein the outer frame is represented by a dotted line.
Figure 4:
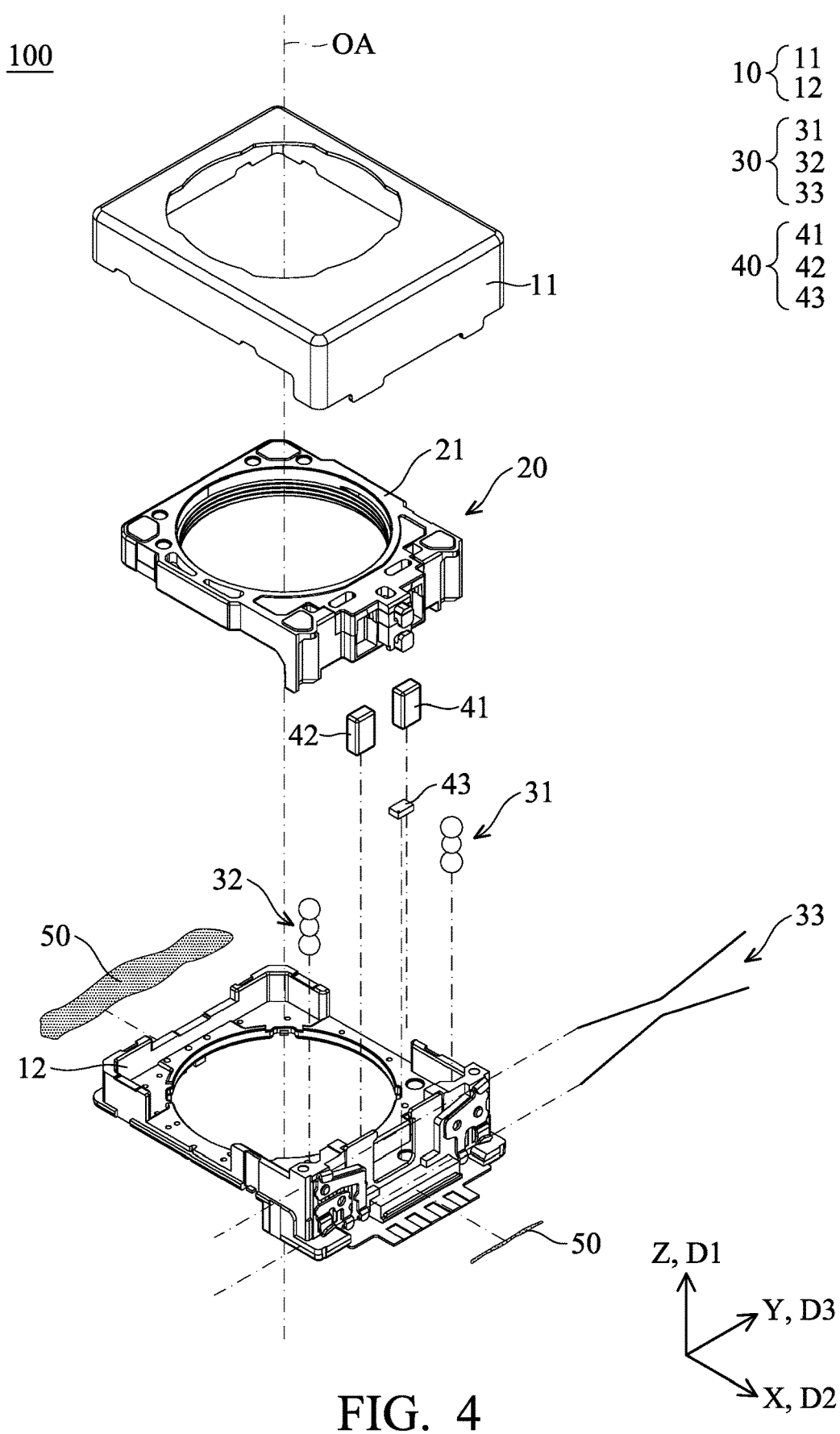
FIG. 4 is an exploded view of the optical element driving mechanism according to some embodiments of the present disclosure.

Please refer to FIG. 2, FIG. 3 and FIG. 4. FIG. 2 is a schematic view of the optical element driving mechanism 100 and an optical element OE according to some embodiments of the present disclosure, wherein an outer frame 11 is represented by a dotted line; FIG. 3 is a schematic view of the optical element driving mechanism 100 and an optical element OE according to some embodiments of the present disclosure, wherein an outer frame 11 is represented by a dotted line; FIG. 4 is an exploded view of the optical element driving mechanism 100 according to some embodiments of the present disclosure.

As shown in FIG. 2, FIG. 3 and FIG. 4, the optical element driving mechanism 100 may include a fixed part 10, a movable part 20, a driving assembly 30, a sensing assembly 40, and a connecting element 50.

As shown in FIG. 2, FIG. 3 and FIG. 4, the movable part 20 may hold and is connected to the optical element OE, and the driving assembly 30 may drive the movable part 20 to move relative to the fixed part 10.

The fixed part 10 may include an outer frame 11 and a base 12. According to some embodiments of the present disclosure, the outer frame 11 may be disposed on the base 12 to form an inner space and to accommodate the elements of the optical element driving mechanism 100.

The movable part 20 may include an optical element holder 21. As shown in FIG. 2, the optical element holder 21 may hold the optical element OE. The optical element holder 21 may be disposed between the outer frame 11 and the base 12 along a first direction D1 that is parallel to an optical axis OA.

According to some embodiments of the present disclosure, the optical element OE may be fixed to the optical element holder 21, so that the optical element OE also moves with the optical element holder 21 when the optical element holder 21 moves.

The driving assembly 30 may include a first supporting assembly 31, a second supporting assembly 32, and a wire assembly 33.

The sensing assembly 40 may include a first magnetic element 41, a second magnetic element 42, and a sensing element 43.

Figure 5:
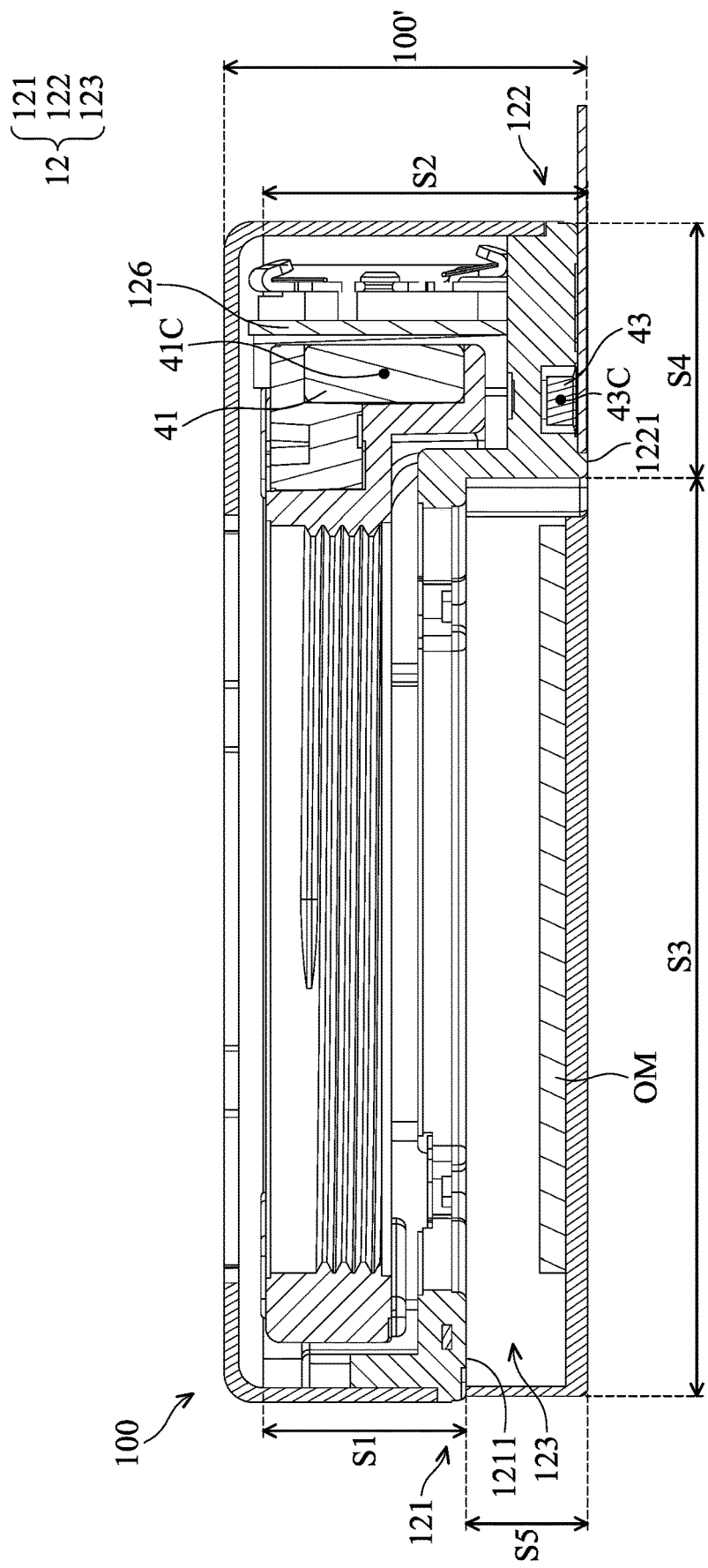
FIG. 5 is a cross-sectional view of the optical element driving mechanism along line A-A' of FIG. 2, according to some embodiments of the present disclosure, which also shows an exemplary optical module

Please refer to FIG. 5, FIG. 5 is a cross-sectional view of the optical element driving mechanism 100 along line A-A' of FIG. 2, according to some embodiments of the present disclosure, which also shows an exemplary optical module OM.

Please refer to FIG. 5, the base 12 may include a base first portion 121, a base second portion 122, and an accommodation portion 123. According to some embodiments of the present disclosure, the base first portion 121 refers to the portion of the base 12 that does not extend downward along the first direction D1, and the base first portion 121 may overlap the optical element holder 21 along the first direction D1. According to some embodiments of the present disclosure, the base second portion 122 of the base refers to the portion of the base 12 that is extending downward along the first direction D1, and the base second portion 122 does not overlap the optical element holder 21 along the first direction D1.

As shown in FIG. 5, according to some embodiments of the present disclosure, in the first direction D1, a maximum dimension S1 of the base first portion 121 may be smaller than a maximum dimension S2 of the base second portion 122. According to some embodiments of the present disclosure, the maximum dimension S1 of the base first portion 121 may be the distance from the uppermost part of the base first portion 121 to the lowermost part of the base first portion 121 along the first direction D1. According to some embodiments of the present disclosure, the maximum dimension S2 of the base second portion 122 may be the distance from the uppermost portion of the base second portion 122 to the lowermost portion of the base second portion 122 along the first direction D1.

According to some embodiments of the present disclosure, the base second portion 122 may extend downward (e.g., along the opposite direction of the first direction D1, or the —Z direction) beyond the base first portion 121.

As shown in FIG. 5, according to some embodiments of the present disclosure, in a second direction D2 that is perpendicular to the first direction D1, a maximum dimension S3 of the base first portion 121 may be larger than a maximum dimension S4 of the base second portion 122.

The accommodation portion 123 may have a recessed structure. According to some embodiments of the present disclosure, the recessed structure of the accommodation portion 123 may have a space for accommodating an optical module OM. According to some embodiments of the present disclosure, the accommodation portion 123 may be located below the base first portion 121. For example, in the first direction D1, the base first portion 121 and the accommodation portion 123 may at least partially overlap each other. However, the base first portion 121 and the accommodation portion 123 may not overlap each other when viewed along any direction (for example, the second direction D2) that is perpendicular to the first direction D1.

According to some embodiments of the present disclosure, in the first direction D1, the second portion 122 of the base and the accommodation portion 123 may not overlap each other. However, the base second portion 122 and the accommodation portion 123 may at least partially overlap each other when viewed along the second direction D2.

According to some embodiments of the present disclosure, the optical module OM may be a photosensitive element for receiving light from the optical element OE. Also, the optical module OM may be fixedly connected to the base 12.

As shown in FIG. 5, the base 12 may correspond to an optical module OM. For example, according to some embodiments of the present disclosure, the optical module OM may be disposed under the base first portion 121 of the base 12 (for example, along the opposite direction of the first direction D1, or the −Z direction), and the base first portion 121 of the base 12 and the optical module OM may be arranged along the first direction D1.

According to some embodiments of the present disclosure, the optical module OM may be disposed adjacent to the base second portion 122 of the base 12. For example, the optical module OM may be disposed on the side of the base second portion 122 of the base 12 (for example, along the opposite direction of the second direction D2, or the −X direction), and the base second portion 122 of the base 12 and the optical module OM may be arranged along the second direction D2.

According to some embodiments of the present disclosure, the accommodation portion 123 of the base 12 may correspond to the optical module OM. For example, according to some embodiments of the present disclosure, the optical module OM may be disposed in the accommodation portion 123.

In this way, an optical element driving mechanism height 100' of the optical element driving mechanism 100 in the first direction D1 may be reduced to achieve the effect of miniaturization.

Please continue to refer to FIG. 5, the base first portion 121 may include a base first portion bottom side 1211, and the base second portion 122 may include a base second portion bottom side 1221.

As shown in FIG. 5, the base first portion bottom side 1211 and the base second portion bottom side 1221 are not coplanar. Also, in the first direction D1, there may be a distance S5 between the base first portion bottom side 1211 and the base second portion bottom side 1221.

According to some embodiments of the present disclosure, the distance S5 between the base first portion bottom side 1211 and the base second portion bottom side 1221 may be greater than a quarter of the optical element driving mechanism height 100' of (S5>100'×¼).

In other words, the base 12 may have a stepped structure (formed by the base first portion 121 and the base second portion 122), and the optical module OM may be arranged in the unoccupied space (accommodation portion 123) of the stepped structure to achieve the effect of miniaturization.

Please return to FIG. 2 and FIG. 3, the base first portion 121 may further include a base first portion connecting wall 1212 and a base first portion supporting wall 1213. The base second portion 122 may further include a base second portion connecting wall 1222 and a base second portion supporting wall 1223.

When viewed along the second direction D2, the base first portion connecting wall 1212 may overlap the outer frame 11, and the base second portion connecting wall 1222 may also overlap the outer frame 11.

According to some embodiments of the present disclosure, the connecting element 50 may be disposed between the outer frame 11 and the base first portion connecting wall 1212, and between the outer frame 11 and the base second portion connecting wall 1222, so as to firmly fix the outer frame 11 to the base 12.

According to some embodiments of the present disclosure, an area of the base first portion connecting wall 1212 may be larger than an area of the base second portion connecting wall 1222. In this way, the space of the base second portion 122 may be effectively used, thereby achieving the effect of miniaturization.

Please continue to refer to FIG. 2 and FIG. 3, when viewed along the first direction D1, the base first portion supporting wall 1213 and the outer frame 11 may at least partially overlap each other, and the base second portion supporting wall 1223 and the outer frame 11 may also at least partially overlap each other.

Therefore, the outer frame 11 may be disposed on the base first portion supporting wall 1213 and the base second portion supporting wall 1223, so as to firmly fix the outer frame 11 to the base 12.

As shown in FIG. 2 and FIG. 3, the outer frame 11 and the base second portion supporting wall 1223 may not overlap each other when viewed along the second direction D2. Moreover, the connecting element 50 may not be provided on the surface 1223', which is perpendicular to the second direction D2, of the base second portion supporting wall 1223.

In this way, the amount of the connecting element 50 may be reduced, thereby reducing the weight of the optical element driving mechanism 100.

Figure 6:
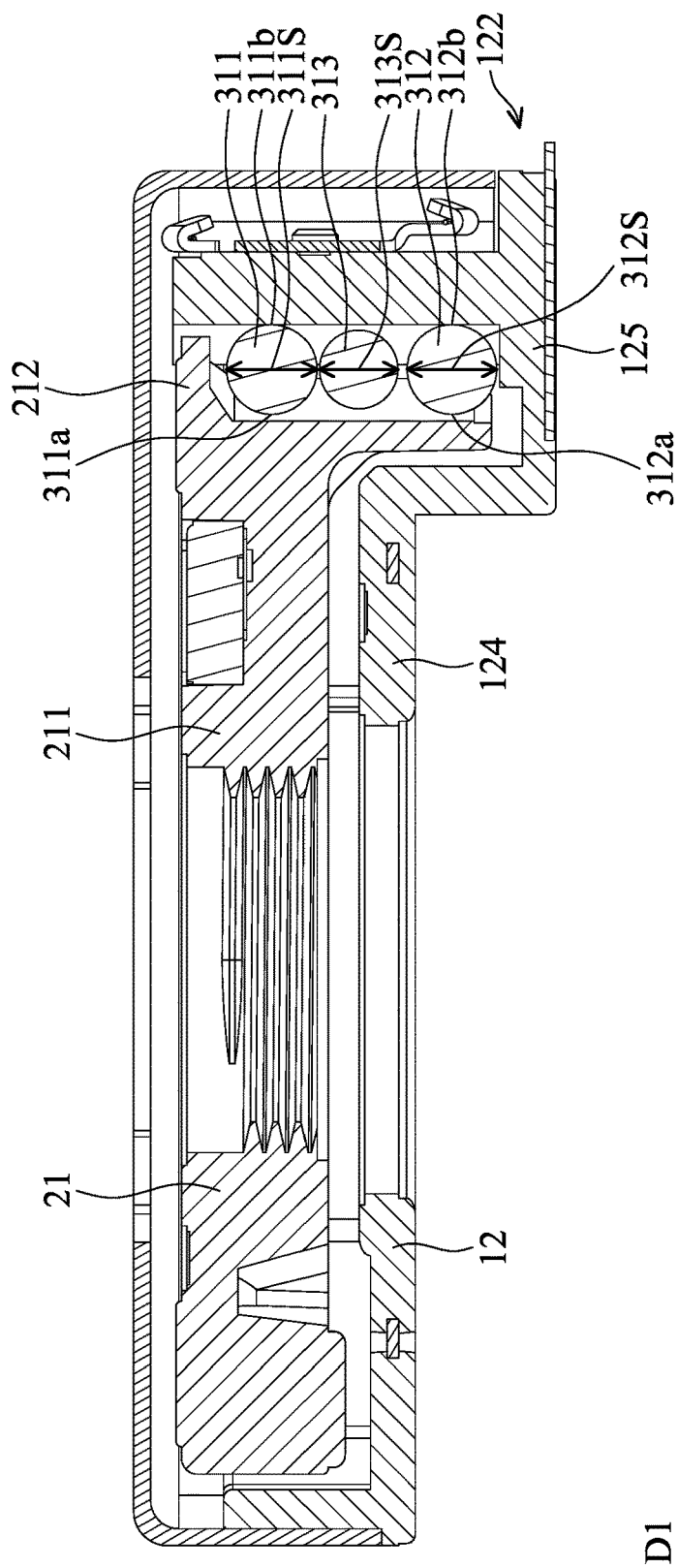
FIG. 6 is a cross-sectional view of the optical element driving mechanism along line B-B' of FIG. 2, according to some embodiments of the present disclosure, which also shows an exemplary optical module.

Please refer to FIG. 6, FIG. 6 is a cross-sectional view of the optical element driving mechanism 100 along line B-B' of FIG. 2, according to some embodiments of the present disclosure, which also shows an exemplary optical module OM.

As shown in FIG. 6, the first supporting assembly 31 may be disposed between the optical element holder 21 and the base 12, and the first supporting assembly 31 may be disposed in the base second portion 122 of the base 12.

The optical element holder 21 may include an optical element holder body 211 and an optical element holder stopper 212, and the base 12 may further include a base body 124, a base stopper 125, and a magnetic conductive element 126 (Please refer to FIG. 5).

According to some embodiments of the present disclosure, the optical element holder stopper 212 may extend from the optical element holder body 211 toward the base 12 along a direction that is perpendicular to the first direction D1, and the base stopper 125 may also extend from the base body 124 toward the optical element holder 21 along a direction that is perpendicular to the first direction D1.

Please refer to FIG. 6, the optical element holder body 211, the optical element holder stopper 212, the base body 124 and the base stopper 125 may form an accommodation space for accommodating the first supporting assembly 31.

Moreover, in the first direction D1, the first supporting assembly 31 is disposed between the optical element holder stopper 212 and the base stopper 125. Therefore, the optical element holder stopper 212 may limit a movement range of the first supporting assembly 31, and the base stopper 125 may also limit the movement range of the first supporting assembly 31.

According to some embodiments of the present disclosure, the optical element holder stopper 212 may be disposed above (e.g., the positive direction of the first direction D1, or the +Z direction) the first supporting assembly 31.

According to some embodiments of the present disclosure, the base stopper 125 may be disposed below (e.g., the reverse of the first direction D1, or the −Z direction) the first supporting assembly 31.

As shown in FIG. 6, the first supporting assembly 31 may include a first supporting assembly first supporting element 311, a first supporting assembly second supporting element 312, and a first supporting assembly third supporting element 313.

According to some embodiments of the present disclosure, the first supporting assembly 31 may have a curved surface. For example, the first supporting assembly first supporting element 311, the first supporting assembly second supporting element 312, and the first supporting assembly third supporting element 313 may have spherical shapes.

In this way, the movement of the first supporting assembly 31 may be smoother.

The first supporting assembly first supporting element 311, the first supporting assembly second supporting element 312, and the first supporting assembly third supporting element 313 may be arranged along the first direction D1 that is parallel to the optical axis OA.

Also, the first supporting assembly third supporting element 313 may be disposed between the first supporting assembly first supporting element 311 and the first supporting assembly second supporting element 312.

In this way, the first supporting assembly first supporting element 311 may be avoided from being in direct contact with the first supporting assembly second supporting element 312, thereby the movement of the first supporting assembly 31 is smoother.

According to some embodiments of the present disclosure, a dimension 311S of the first supporting assembly first supporting element 311 and a dimension 312S of the first supporting assembly second supporting element 312 may be the same.

According to some embodiments of the present disclosure, a dimension 313S of the first supporting assembly third supporting element 313 may be different from the dimension 311S of the first supporting assembly first supporting element 311 and the dimension 312S of the first supporting assembly second supporting element 312.

According to some embodiments of the present disclosure, the dimension 313S of the first supporting assembly third supporting element 313 may be smaller than the dimension 311S of the first supporting assembly first supporting element 311 and the dimension 312S of the first supporting assembly second supporting element 312.

For example, the dimension 311S of the first supporting assembly first supporting element 311 may be about 0.8 mm, the dimension 312S of the first supporting assembly second supporting element 312 may be about 0.8 mm, and the dimension 313S of the first supporting assembly third supporting element 313 may be about 0.7 mm.

Please continue to refer to FIG. 6, the first supporting assembly first supporting element 311 may include an optical element holder contacting portion 311a and a base contacting portion 311b. The optical element holder contacting portion 311a may abut against the optical element holder 21, and the base contacting portion 311b may abut against the base 12.

Similarly, the first supporting assembly second supporting element 312 may include an optical element holder contacting portion 312a and a base contacting portion 312b. The optical element holder contacting portion 312a may abut against the optical element holder 21, and the base contacting portion 312b may abut against the base 12.

Although the second supporting assembly 32 is not shown in FIG. 6, the second supporting assembly 32 is similar to the first supporting assembly 31. The second supporting assembly first supporting element 321, the second supporting assembly second supporting element 322 and the second supporting assembly third supporting element 323 of the second supporting assembly 32 are similar to the first supporting assembly first supporting element 311, the first supporting assembly second supporting element 312 and the first supporting assembly third supporting element 313 of the first supporting assembly 31, and the description will not be repeated herein.

Please return to FIG. 5, the first magnetic element 41 and the second magnetic element 42 (not shown in FIG. 5) may be disposed on the movable part 20. According to some embodiments of the present disclosure, the first magnetic element 41 and the second magnetic element 42 may be fixedly disposed on the optical element holder 21 of the movable part 20.

The first magnetic element 41 and the second magnetic element 42 may correspond to the magnetic conductive element 126 of the base 12. For example, the first magnetic element 41 and the second magnetic element 42 may be adjacent to and face the magnetic conductive element 126.

The magnetic conductive element 126 may be fixedly disposed on the base body 124. Therefore, the optical element holder 21 provided with the first magnetic element 41 and the second magnetic element 42 may be pulled closer to the magnetic conductive element 126 of the base 12 by the magnetic force of the first magnetic element 41 and the second magnetic element 42, thereby the optical element holder 21 may abut against the base 12 to avoid undesired movement (e.g., shaking, etc.) between the optical element holder 21 and the base 12.

Figure 7:
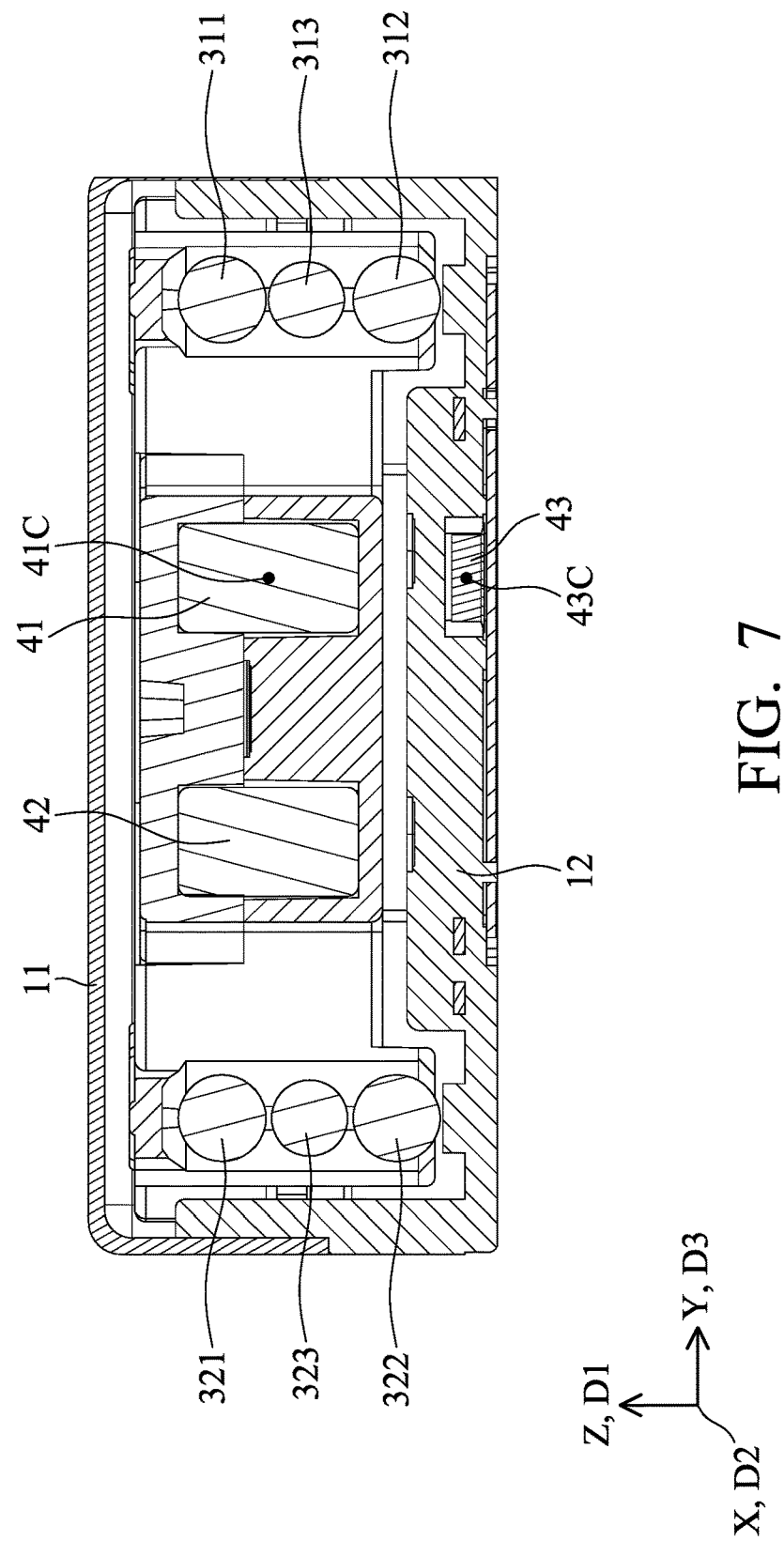
FIG. 7 is a cross-sectional view of the optical element driving mechanism along line C-C' of FIG. 2, according to some embodiments of the present disclosure.

Please refer to FIG. 7, FIG. 7 is a cross-sectional view of the optical element driving mechanism 100 along line C-C' of FIG. 2, according to some embodiments of the present disclosure.

As shown in FIG. 7, the first magnetic element 41 of the sensing assembly 40 may have a center 41C, and the sensing element 43 may have a center 43C. According to some embodiments of the present disclosure, the center 41C of the first magnetic element 41 and the center 43C of the sensing element 43 may overlap each other in the first direction D1 when viewed along the second direction D2.

In this way, the sensing element 43 may receive a stronger magnetic field, thereby improving the sensitivity of the sensing element 43.

Please return to FIG. 5, the center 41C of the first magnetic element 41 and the center 43C of the sensing element 43 may not overlap (or offset from) each other in the first direction D1 when viewed along a third direction D3 that is perpendicular to the first direction D1 and the second direction D2.

In this way, the sensing element 43 may receive stronger magnetic field changes, thereby improving the sensitivity of the sensing element 43.

Figure 8:
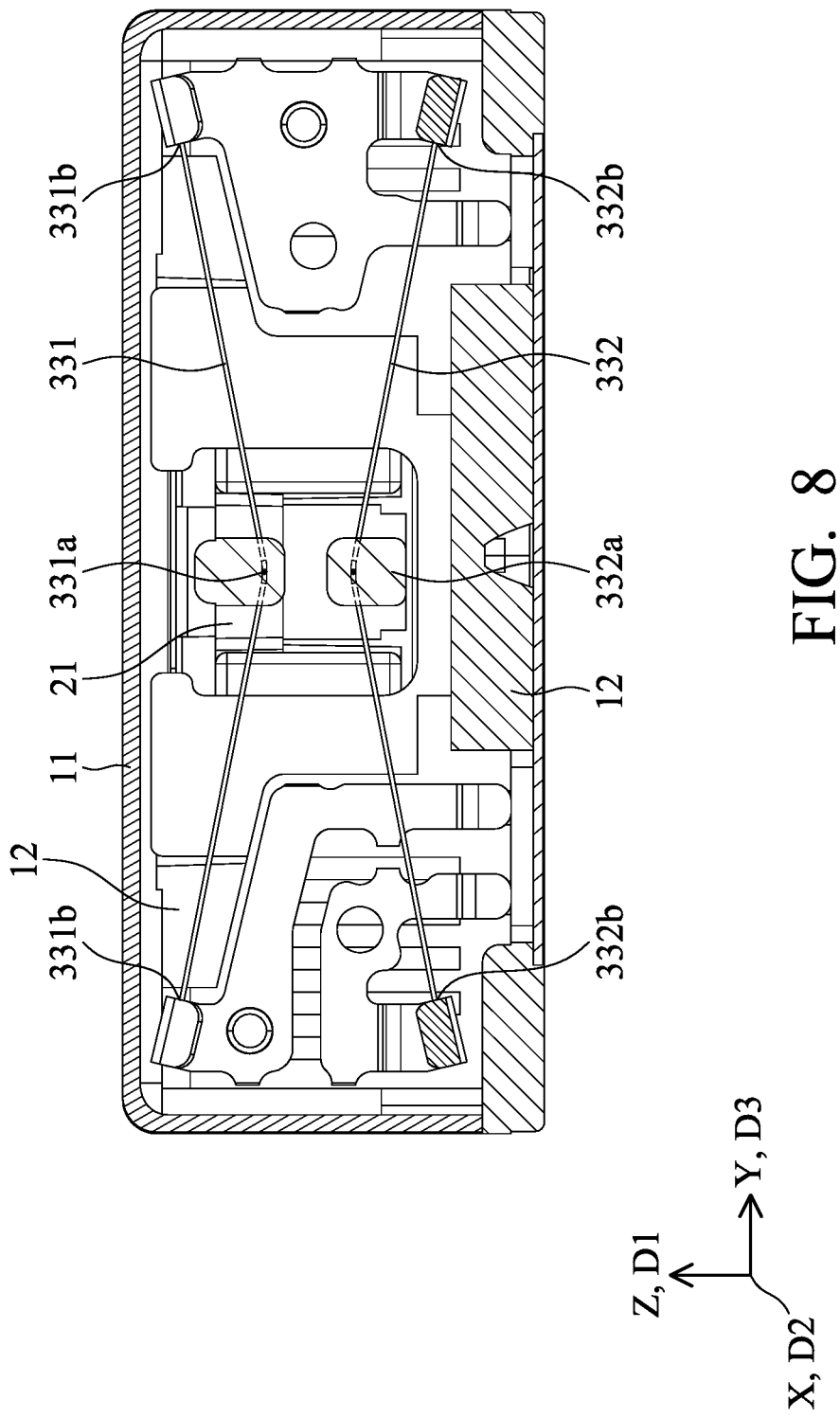
FIG. 8 is a cross-sectional view of the optical element driving mechanism along line D-D' of FIG. 2, according to some embodiments of the present disclosure.

Please refer to FIG. 8, FIG. 8 is a cross-sectional view of the optical element driving mechanism 100 along line D-D' of FIG. 2, according to some embodiments of the present disclosure.

As shown in FIG. 8, the wire assembly 33 may include a first wire 331 and a second wire 332.

According to some embodiments of the present disclosure, the first wire 331 and the second wire 332 may change their shapes (e.g., change lengths) after receiving the current. According to some embodiments of the present disclosure, the first wire 331 and the second wire 332 may include shape memory alloys (SMA).

The first wire 331 and the second wire 332 may be in contact with the optical element holder 21 and the base 12, and the first wire 331 and the second wire 332 may drive the optical element holder 21 to move relative to the base 12 along the first direction D1.

As shown in FIG. 8, the first wire 331 may include a first wire optical element holder contacting portion 331a and a first wire base contacting portion 331b. The second wire 332 may include a second wire optical element holder contacting portion 332a, and a second wire base contacting portion 332b.

The first wire optical element holder contacting portion 331a may be in contact with and abut against the optical element holder 21. The first wire base contacting portion 331b may be in contact with and be fixed to the base 12.

The second wire optical element holder contacting portion 332a may be in contact with and abut against the optical element holder 21. The second wire base contacting portion 332b may be in contact with and be fixed to the base 12.

Figure 9:
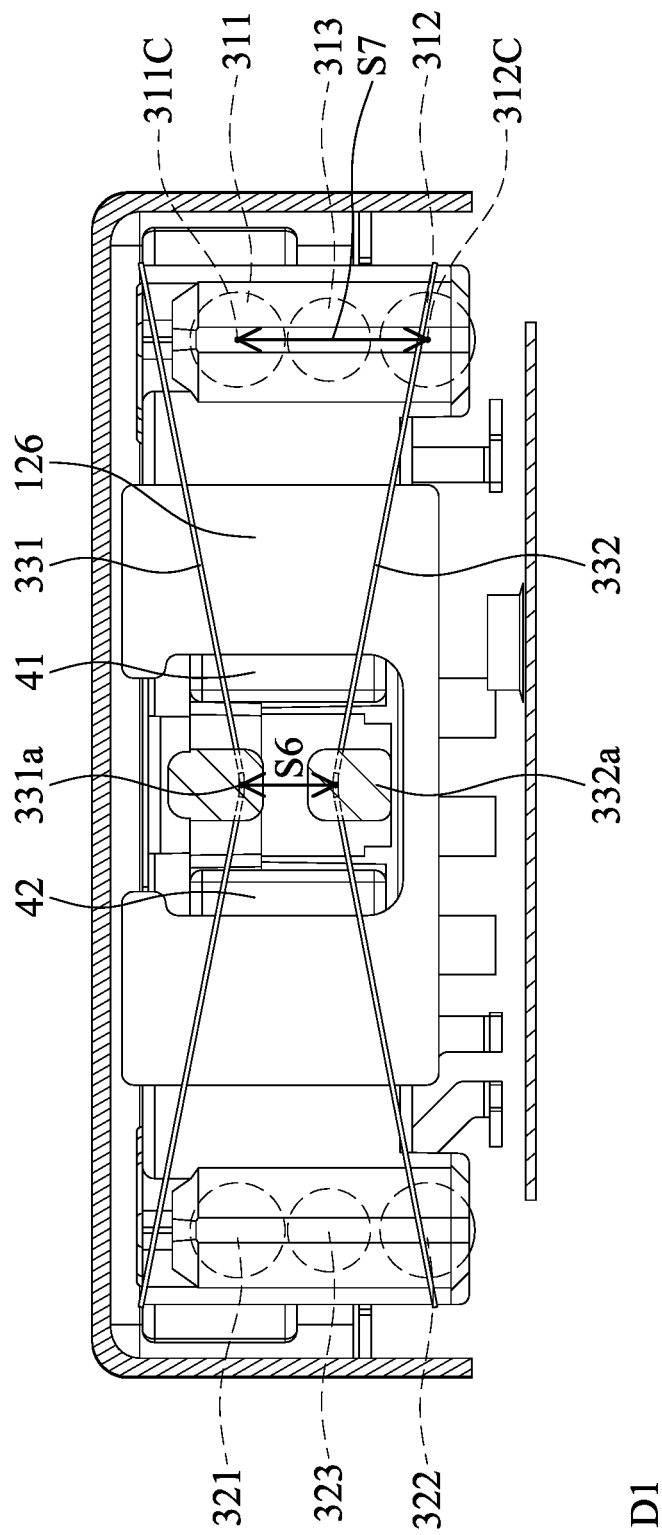
FIG. 9 is a cross-sectional view of the optical element driving mechanism along line D-D' of FIG. 2, according to some embodiments of the present disclosure, wherein a base is omitted, and a first supporting assembly and a second supporting assembly are shown in dashed lines.

Please refer to FIG. 9, FIG. 9 is a cross-sectional view of the optical element driving mechanism 100 along line D-D' of FIG. 2, according to some embodiments of the present disclosure, wherein the base 21 is omitted, and the first supporting assembly 31 and the second supporting assembly 32 are shown in dashed lines.

As shown in FIG. 9, in the first direction D1, a minimum distance S6 between the first wire optical element holder contacting portion 331a and the second wire optical element holder contacting portion 332a may be different from a minimum distance S7 between a center 311C of the first supporting assembly first supporting element 311 and a center 312C of the first supporting assembly second supporting element 312.

In the first direction D1, the minimum distance S6 between the first wire optical element holder contacting portion 331a and the second wire optical element holder contacting portion 332a may be smaller than the minimum distance S7 between the center 311C of the first supporting assembly first supporting element 311 and the center 312C of the first supporting assembly second supporting element 312.

As shown in FIG. 9, in the first direction D1, the first wire optical element holder contacting portion 331a may be disposed between the optical element holder contacting portion 311a of the first supporting assembly first supporting element 311 and the optical element holder contacting portion 312a of the first supporting assembly second supporting element 312.

In this way, when the optical element holder 21 moves relative to the base 12, the undesired movement (for example, shaking, etc.) of the optical element holder 21 may be avoided, thereby the optical element driving mechanism 100 is more stable.

Please return to FIG. 6, the outer frame 11 may limit the movement range of the optical element holder 21 when the optical element holder 21 moves along the positive direction of the first direction D1 (e.g., +Z direction).

As shown in FIG. 6, the base 12 may limit the movement range of the optical element holder 21 when the optical element holder 21 moves in the opposite direction of the first direction D1 (e.g., the −Z direction).

As shown in FIG. 6, the first supporting assembly 31 and the base 12 may limit the movement range of the optical element holder 21 when the optical element holder 21 moves along the positive direction of the second direction D2 (e.g., the +X direction).

As shown in FIG. 6, the base 12 may limit the movement range of the optical element holder 21 when the optical element holder 21 moves in the opposite direction of the second direction D2 (e.g., the −X direction).

Returning to FIG. 7, the base 12 may limit the movement range of the optical element holder 21 when the optical element holder 21 moves along the third direction D3 (positive or opposite).

In this way, the movement range of the optical element holder 21 may be limited by using different elements, so as to avoid damage to the elements, and the movement range of the optical element holder 21 may be more effectively limited.

In general, the optical element driving mechanism 100 of the embodiment of the present disclosure may reduce the optical element driving mechanism height 100' along the optical axis direction, thereby achieving the effect of miniaturization.

Moreover, the optical element driving mechanism 100 of the embodiment of the present disclosure may make the optical element holder 21 move stably and smoothly, thereby avoiding undesired movement of the optical element holder 21.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
   a fixed part, comprising a base, wherein the base corresponds to an optical module;
   a movable part, connected to an optical element, wherein the movable part is movable relative to the fixed part; and
   a driving assembly, driving the movable part to move relative to the fixed part,
   wherein the base comprises an accommodation portion, and the accommodation portion has a recessed structure for accommodating the optical module,
   wherein the base comprises a base first portion and a base second portion,
   wherein in a first direction that is parallel to an optical axis, the base first portion and the accommodation portion at least partially overlap each other, wherein in the first direction, the base second portion does not overlap the accommodation portion, wherein the accommodation portion corresponds to the optical module, wherein the optical element driving mechanism further comprising a connecting element, wherein the fixed part further comprises an outer frame, wherein the base first portion comprises a base first portion connecting wall, and the base second portion comprises a base second portion connecting wall, wherein the connecting element is disposed between the outer frame and the base first portion connecting wall, and between the outer frame and the base second portion connecting wall, wherein an area of the base first portion connecting wall is larger than an area of the base second portion connecting wall, and wherein the connecting element is glue.

2. The optical element driving mechanism as claimed in claim 1, wherein the base first portion does not overlap the accommodation portion when viewed along a direction that is perpendicular to the first direction.

3. The optical element driving mechanism as claimed in claim 1, wherein the base second portion at least partially overlaps the accommodation portion when viewed along a second direction that is perpendicular to the first direction.

4. The optical element driving mechanism as claimed in claim 1, wherein the base first portion comprises a base first portion bottom side, and the base second portion comprises a base second portion bottom side, and wherein the base first portion bottom side and the base second portion bottom side are not coplanar.

5. The optical element driving mechanism as claimed in claim 4, wherein in the first direction, the optical element driving mechanism has an optical element driving mechanism height, wherein in the first direction, there is a distance between the base first portion bottom side and the base second portion bottom side, and wherein the distance between the base first portion bottom side and the base second portion bottom side is greater than a quarter of the optical element driving mechanism height.

6. The optical element driving mechanism as claimed in claim 1, wherein the base second portion further comprises a base second portion supporting wall, wherein the outer frame and the base second portion supporting wall at least partially overlap each other when viewed along the first direction, and wherein the outer frame does not overlap the base second portion supporting wall when viewed along a second direction that is perpendicular to the first direction.

7. The optical element driving mechanism as claimed in claim 1, wherein the movable part comprises an optical element holder, wherein the driving assembly comprises a first supporting assembly, disposed between the optical element holder and the base, and the first supporting assembly comprises:

a first supporting assembly first supporting element, comprising:

an optical element holder contacting portion, abutting against the optical element holder; and a base contacting portion, abutting against the base;

a first supporting assembly second supporting element, comprising:

an optical element holder contacting portion, abutting against the optical element holder; and a base contacting portion, abutting against the base; and a first supporting assembly third supporting element, disposed between the first supporting assembly first supporting element and the first supporting assembly second supporting element, wherein the first supporting assembly first supporting element, the first supporting assembly second supporting element, and the first supporting assembly third supporting element are arranged along a first direction that is parallel to an optical axis.

8. The optical element driving mechanism as claimed in claim 7, wherein a dimension of the first supporting assembly second supporting element is the same as a dimension of the first supporting assembly first supporting element, and wherein a dimension of the first supporting assembly third supporting element is different from the dimension of the first supporting assembly first supporting element and the dimension of the first supporting assembly second supporting element.

9. The optical element driving mechanism as claimed in claim 7, wherein the driving assembly further comprises a wire assembly, wherein the wire assembly comprises:

a first wire, comprising a first wire optical element holder contacting portion, wherein the first wire optical element holder contacting portion abuts against the optical element holder; and a second wire, comprising a second wire optical element holder contacting portion, wherein the second wire optical element holder contacting portion abuts against the optical element holder, wherein in the first direction, a minimum distance between the first wire optical element holder contacting portion and the second wire optical element holder contacting portion is smaller than a minimum distance between a center of the first supporting assembly first supporting element and a center of the first supporting assembly second supporting element.

10. The optical element driving mechanism as claimed in claim 9, wherein in the first direction, the first wire optical element holder contacting portion is disposed between the optical element holder contacting portion of the first supporting assembly first supporting element and the optical element holder contacting portion of the first supporting assembly second supporting element.

11. The optical element driving mechanism as claimed in claim 7, wherein the optical element holder comprises:

an optical element holder body; and an optical element holder stopper, extending from the optical element holder body toward the base along a direction that is perpendicular to the first direction, wherein the optical element holder stopper limits a movement range of the first supporting assembly.

12. The optical element driving mechanism as claimed in claim 11, wherein the base comprises:

a base body; and a base stopper, extending from the base body toward the optical element holder along a direction that is perpendicular to the first direction, wherein in the first direction, the first supporting assembly is disposed between the optical element holder stopper and the base stopper, and wherein the base stopper limits the movement range of the first supporting assembly.

13. The optical element driving mechanism as claimed in claim 7, wherein the fixed part further comprises an outer frame, wherein in the first direction, the optical element holder is disposed between the outer frame and the base, and wherein the outer frame limits a movement range of the optical element holder when the optical element holder moves along a positive direction of the first direction.

14. The optical element driving mechanism as claimed in claim 13, wherein the base limits the movement range of the optical element holder when the optical element holder moves along an opposite direction of the first direction.

15. The optical element driving mechanism as claimed in claim 7, wherein the first supporting assembly and the base limit a movement range of the optical element holder when the optical element holder moves in a positive direction along a second direction that is perpendicular to the first direction.

16. The optical element driving mechanism as claimed in claim 7, wherein the base limits a movement range of the optical element holder when the optical element holder moves in an opposite direction along a second direction that is perpendicular to the first direction.

17. The optical element driving mechanism as claimed in claim 7, wherein the base limits a movement range of the optical element holder when the optical element holder moves along a third direction that is perpendicular to the first direction.

18. The optical element driving mechanism as claimed in claim 1, further comprising a sensing assembly, comprising a first magnetic element and a sensing element,
wherein a center of the first magnetic element and a center of the sensing element overlap each other along a first direction that is parallel to an optical axis when viewed along a second direction that is perpendicular to the optical axis, and
wherein the center of the first magnetic element and the center of the sensing element do not overlap each other along the first direction when viewed along a third direction that is perpendicular to the first direction and the second direction.

\* \* \* \* \*